Aug. 4, 1925.

C. M. SEMLER

REPAIR MOLD

Filed April 2, 1923

Inventor
Clyde M. Semler.

By

Attorney

Aug. 4, 1925.

C. M. SEMLER 1,548,215

REPAIR MOLD

Filed April 2, 1923   2 Sheets-Sheet 2

Inventor
Clyde M. Semler.
By G. L. Ely
Attorney

Patented Aug. 4, 1925.

1,548,215

UNITED STATES PATENT OFFICE.

CLYDE M. SEMLER, OF AKRON, OHIO, ASSIGNOR TO THE FIRESTONE TIRE AND RUBBER COMPANY, OF AKRON, OHIO, A CORPORATION OF OHIO.

REPAIR MOLD.

Application filed April 2, 1923. Serial No. 629,328.

*To all whom it may concern:*

Be it known that I, CLYDE M. SEMLER, a citizen of the United States, residing at Akron, in the county of Summit, State of Ohio, have invented certain new and useful Improvements in Repair Molds, of which the following is a specification.

My invention relates to repair molds for use in vulcanizing repaired portions of pneumatic tires, particularly heavy duty sizes, such as truck tires. As will presently appear, however, the invention is not confined to use with large tires and the principles thereof may be applied in the construction of other molds than those used for repair work.

Truck tires and other larger sizes of pneumatic tires are built with an increased number of fabric layers and a greater proportion of rubber composition as their size increases to withstand a greater internal pressure than smaller tires. Repaired portions of such tires are often imperfectly vulcanized with the forms of repair apparatus now available because it is difficult to distribute heat uniformly and to equal degrees throughout their numerous plies and their heavy side-walls and tread elements. The result of such imperfect vulcanization is an improper adhesion between the tire elements, particularly when the repaired portion adjoins the old tire and a subsequent blowout in the tire.

My invention is designed with the particular purpose in view of obviating the above mentioned difficulty by providing a form of heater for vulcanizing repairs, which will radiate heat with a more uniform intensity than present types of vulcanizing molds through the thickest tire so that a tire may be vulcanized to the same degree throughout a given area and a proper union of the tire elements produced.

Another purpose of my invention is to provide a repair mold that will distribute a uniform degree of heat throughout the entire portion of the tire which it is designed to cover.

With the above and other objects in view, the invention comprehends a mold into which a live heating medium may be introduced to traverse the mold in a tortuous path so arranged that heat is radiated from substantially the entire molding surface with a uniform degree of intensity.

In the drawings accompanying and forming a part of this specification, two forms of the molds have been illustrated as exemplifying the principles of my invention.

Figure 1:
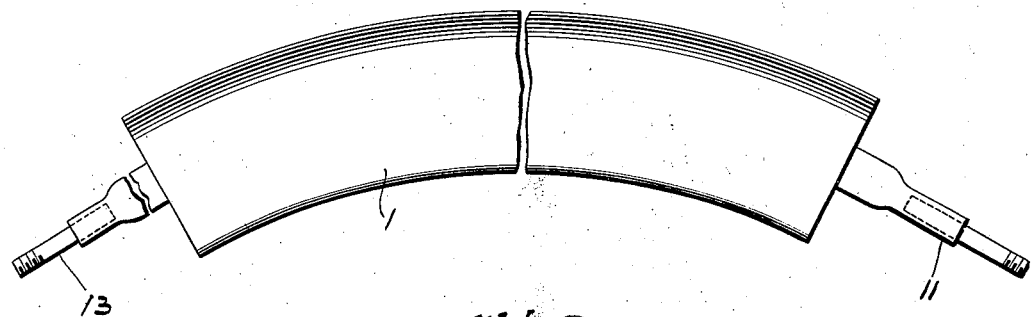
Figure 1 is a side elevational view, partly broken away, illustrating a preferred form of my invention for repairing the tread portion of a tire.
Figure 2:
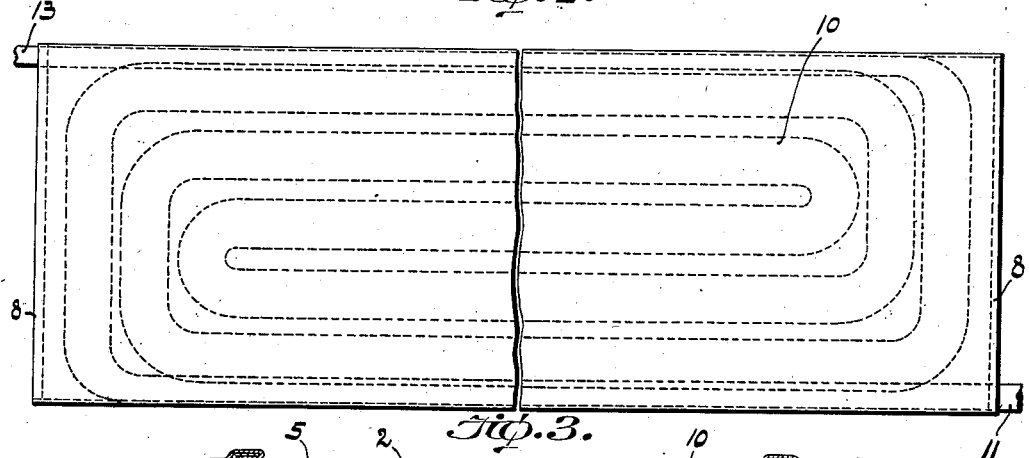
Figure 2 is a plan view, partly broken away and drawn on an enlarged scale.
Figure 3:
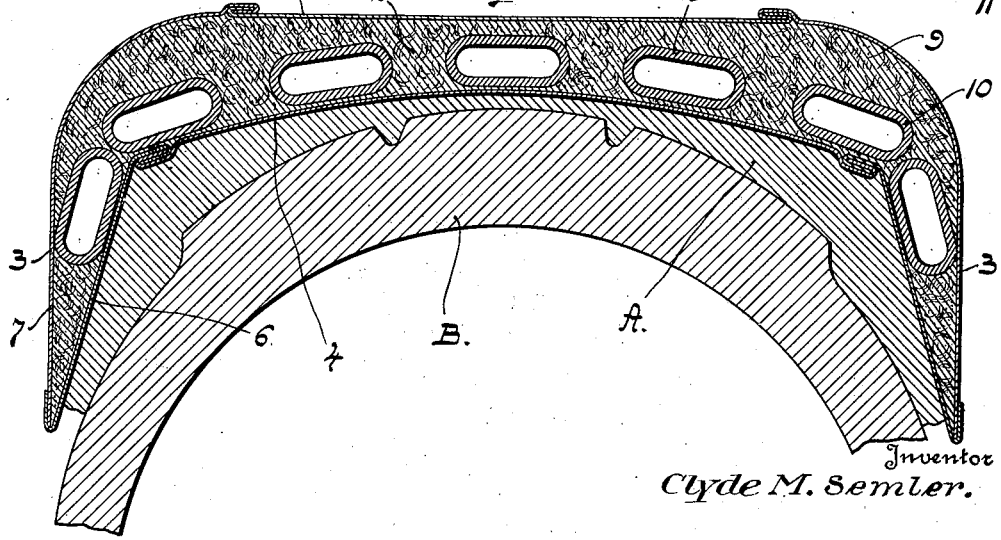
Figure 3 is a transverse sectional view, taken on the line 3—3 of Figure 2 and drawn on a further enlarged scale.

Referring to the drawings by numeral, 1 designates, as a whole, my preferred form of mold shown in Figures 1 to 3. It comprises a longitudinally curved shell, preferably formed of sheet metal, having a tread molding portion 2 provided with side portions 3 projecting toward the center of the tire to form a mold cavity for receiving a tire, as shown in Figure 3. The tread molding portion 2 is formed by spaced apart inner and outer walls 4 and 5 respectively, the inner wall being arched transversely, while the outer wall is substantially flat in the same direction. The side portions 3 are also formed of spaced apart inner and outer walls 6 and 7 respectively which converge toward the center of the tire. Preferably the inner side walls 6 are oblique so that the mold may be readily positioned over the rubber matrix A which is placed over the tread of the tire B, and the walls 7 are vertical and rounded at their juncture with the wall 5. The ends of the mold shell are closed by suitable solder plates 8. The space between the walls of the mold is packed with a suitable heat retaining medium 9, such as asbestos, in which there is embedded a rectangular heating coil of oblate piping 10. The piping 10 is coiled in any suitable manner, that shown in Figure 2 being suitable for the purposes of the invention. The inlet pipe 11 projects through one end plate 8 of the mold to be connected with any suitable source of supply for introducing steam or hot water into the coil, and the outlet pipe 13 projects through the opposite end plate 13. The piping lies along the inner wall of the pad so that the greater portion of the heat is received by the tire.

The mold cavity, as indicated in Figure 3, is designed to contain a matrix plate A of rubber or rubber composition for forming non-skid protuberances in the tire.

Figure 4:
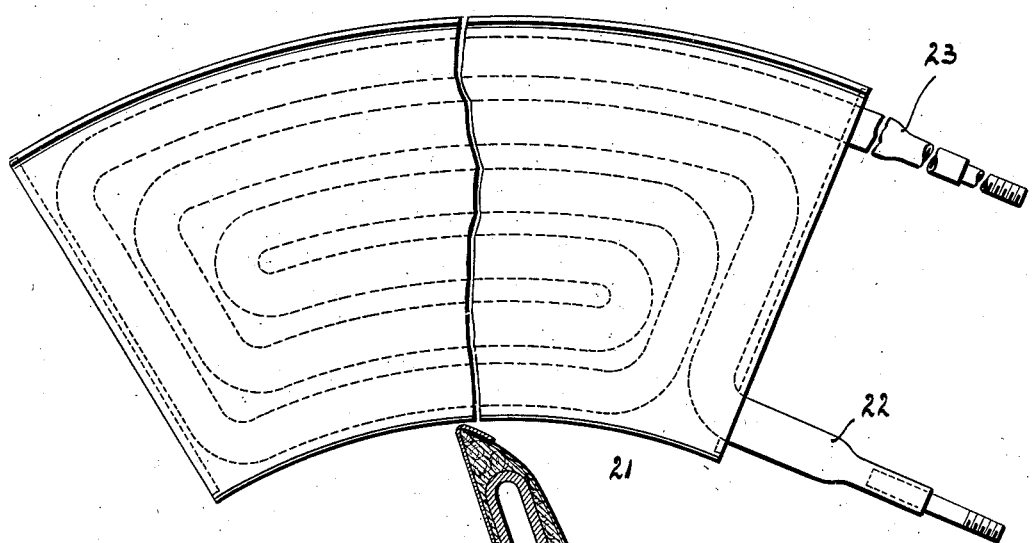
Figure 4 is a view of a modified form of my mold for repairing the side-walls and bead portions of a tire.
Figure 5:
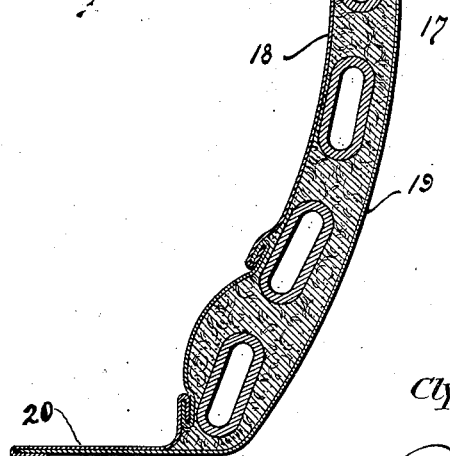
Figure 5 is a transverse sectional view, taken on the line 5—5 of Figure 4 and drawn on an enlarged scale.

In Figures 4 and 5, I have illustrated a modified form of mold 17 for vulcanizing side-walls and repairs. This form of mold distinguishes from that previously described only in the shape of the shell. Here the shell comprises spaced apart side walls 18 and 19 respectively, the inner wall 18 conforming to the side-wall and bead contour of the tire. The walls 18 and 19 are also formed preferably of sheet metal and are extended below the bead portion to overlap each other and provide a ledge 20 for engagement with the base of the tire bead. The heating coil 21 is formed in the same manner previously described, except that the inlet and outlet length 22 and 23 respectively project from the same end of the mold.

In applying my molds, I prefer to support the tire upon a hollow mandrel in which a heating medium may also be introduced in any suitable manner, although this is not essential to my invention.

The molds may be used singly or in combination and pressed against the tire by any desired means.

Apparatus suitable for this purpose is disclosed in the Re-issue Patent No. 15,120 to Pfeiffer and need not be described herein as it forms no part of the present invention and other apparatus may be utilized with equal advantage in applying the molds, as will be apparent.

What I claim is:

1. In an apparatus for vulcanizing tires, the combination of a flexible pad comprising sheet metal walls, a filling of fibrous material and an embedded coil in said filling, the coil having means by which a heating medium may be introduced therein.

2. In an apparatus for vulcanizing tires, the combination of a flexible pad comprising sheet metal walls, a filling of heat insulating fibrous material between said walls, a coil of piping lying along the inner wall and means to introduce a heating medium within said piping.

3. In an apparatus for vulcanizing tires, the combination of a flexible metallic shell, a filling of heat insulating material in the shell, and a heating coil arranged in substantial contact with the inner wall of the shell.

CLYDE M. SEMLER.